Patented May 11, 1937

2,079,606

UNITED STATES PATENT OFFICE 2,079,606

PROCESS FOR PRODUCING RESINS

Alan Ashby Drummond, Gerrards Cross, and Howard Houlston Morgan, Slough, England, assignors to Imperial Chemical Industries Limited, a corporation of Great Britain No Drawing. Application December 15, 1933, Serial No. 702,649. In Great Britain December 20, 1932

3 Claims. (Cl. 260—4)

This invention relates to a process for the manufacture of resinous compositions, and more particularly to a process for the manufacture of improved resinous compositions of the phenol-aldehyde type.

This invention has as an object a process for making modified resins of the phenol-aldehyde type. A further object is the production of new and improved resinous compositions. A still further object is the manufacture of improved oil modified resins of the phenol-aldehyde type. Other objects will appear hereinafter.

According to the present invention, resinous compositions comprising a synthetic resin of the phenol-aldehyde type having a fatty acid component are manufactured by condensing together a phenol and an aldehyde and a polyhydric alcohol which has been partially esterified with a fatty acid. While our invention is most advantageously carried out with drying oils and the fatty acids derived therefrom, we may also in preparing the partial polyhydric alcohol ester use esters of other fatty acids, or the acids themselves, such as butyric, oleic, stearic, decanoic, dodecanoic, myristic, and the mixture of branched chain fatty acids (having 7-10 carbon atoms) prepared by oxidation of the higher alcohols which are a by-product of methanol synthesis. The condensation of the phenol, aldehyde and partially esterified alcohol is effected, at a raised temperature, and preferably in the presence of inert volatile organic solvent, such as butyl alcohol, methylated spirit or cyclohexanol.

The phenol may be phenol itself or a homologue, such as the cresols, xylenols, or other phenolic body, as for instance p-hydroxydiphenyl, resorcinol, or a naphthol. Other suitable phenolic bodies are para-tertiary amyl phenol, para-tertiary butyl phenol, diphenylolpropane, diphenylolsulfone, diphenylolsulfide, dischlorodiphenylolpropane, p,p'-dihydroxydiphenyl, di-tolylolpropane, and the like.

The preferred aldehyde is formaldehyde; reagents generating formaldehyde, such as para-formaldehyde, hexamethylenetetramine, trioxymethylene and polyoxymethylene may, however, be used.

The higher aldehydes such as acetaldehyde, butyraldehyde, benzaldehyde, etc. may also be employed. Their use, however, constitutes a definitely less preferred embodiment of the invention.

The partially esterfied polyhydric alcohol referred to above is conveniently prepared by alcoholysis, namely, by heating together a fatty oil and polyhydric alcohol, the reaction being preferably accelerated by a suitable alcoholysis catalyst such as litharge, caustic soda, caustic potash, lime, and the alcoholates of the alkaline earth metals. Quantities of catalyst should preferably range from 0.1%–1.0% based on the oil, the exact quantity varying with different catalysts.

The products according to our invention are obtained, after removal of volatile matter, as resinous substances, soluble in alcohols, in mixtures of alcohols and benzene hydrocarbons, or in mixtures of alcohols and cracked petroleum. Their solutions in suitable solvents give valuable varnishes yielding films which after stoving are clear, glossy, hard, flexible and resistant to solvents and chemical reagents.

Our invention is illustrated but not limited by the following example:

Example 20 pounds of mixed xylenols, 20 pounds of 40% formaldehyde solution, 20 pounds of mono-glyceride obtained by heating tung oil with glycerol, 20 pounds of methylated spirit and 6 pounds of a saturated solution of caustic soda in methylated spirit are boiled under a reflux condenser for 4-5 hours. The product is then distilled in an air-stream up to a temperature (in the liquid) of 120° C. and heating continued at 110–120° C. for about 4 hours. The product is then thinned with butanol or other solvent to a suitable viscosity and a lead, manganese or other drier added if desired. The varnish so obtained will form a hard flexible glossy film on metal after ½–1 hour at 125° C.

The mono-glyceride used in the foregoing example was prepared by heating rapidly 30 pounds of raw tung oil, 6 pounds dynamite glycerine, and 14 grams of powdered litharge to 200° C. The temperature is raised to 240° C. in 15 minutes and kept at 240–250° C. for a further 15 minutes or until a sample is soluble in an equal volume of methyl alcohol. This product is glycerol, one hydroxyl group of which has been esterfied with China-wood oil acids. It may also be obtained by heating one mol. of glycerol with one mol. of China-wood oil acids. It is not possible to accomplish the results of this invention by heating oil, glycerol, phenol and aldehyde simultaneously because of the resulting gelation of the drying oil.

Products similar to that of the foregoing example are obtained by varying the materials and proportions thereof. Thus, in the foregoing example we may replace the tung oil mono-glyceride with linseed oil mono-glyceride or with soya bean oil mono-glyceride. A mixture of the glycerides of different oils may be used as for instance replacing the tung oil mono-glyceride of the example with 14 pounds of linseed oil mono-glyceride and 7 pounds of tung oil mono-glyceride.

The various condensation agents, usually used in phenol-aldehyde condensation, may be used in the practice of our invention. These agents, in addition to caustic soda, include ammonia, zinc oxide, mineral acids, or any alkaline or alkaline salt.

The partial fatty acid esters of polyhydric alcohols suitable for use in this invention may be obtained by heating any fatty oil, regardless of its drying properties, with an alcoholysis catalyst. Some examples of suitable semi- and non-drying oils are cottonseed oil, coconut oil, soya bean oil, olive oil, castor oil, and the like. These partial fatty acid esters of polyhydric alcohols may also be obtained from any fatty acid whether liquid, solid, oily, or waxy in nature and irrespective of its drying properties. The true drying oils such as China-wood, linseed, perilla, walnut, oiticica, safflower, rubberseed, menhaden, etc., and/or the acids derived from their saponification, are, however, preferred because of the drying properties they confer upon the finished resins. For the alcoholysis of the fatty oil to partially acylated glycerol, the usual procedure is to heat the oil and glycerol in the ratio of one-two molecular proportions of glycerol to one molecular proportion of oil at 220° C. to 250° C. in the presence of an alcoholysis catalyst for 15 minutes to one hour, or until homogeneous.

The partial esters may also be obtained by heating polyhydric alcohol with aliphatic monobasic acid itself, such as acids derived from the fatty oils mentioned above. Mixed partial esters, as for instance a mixed diglyceride of eleostearic and linoleic acids, for example the alcoholysis product from glycerol and a mixture of fatty oils, are also useful in the manufacture of our improved composition.

We prefer to use glycerol in making the partial polyhydric alcohol esters. Other polyhydric alcohols, such as ethylene glycol, diglycerol, pentaerythritol, monoethylin, monobenzylin, diethylene glycol, trimethylolmethylmethane, and the like may, however, be employed.

The incorporation of drying fatty acid radicals into phenol-aldehyde resins by the process disclosed herein enables varnishes based on a modified phenol-formaldehyde type resin to be prepared which give clear, hard, flexible, glossy film when stoved. The advantage of obtaining a homogeneous product consisting of phenol-aldehyde resin containing drying fatty acids in combined form is emphasized by the well known fact that the glycerol esters of these fatty acids, namely the fatty oils and especially drying and semi-drying oils, are in general incompatible with synthetic resins, and cannot be incorporated therewith in any considerable proportion by simple mixing. Thus, if the raw fatty oil is substituted for the mono-glyceride in the example the reaction mixture remains in two layers until with continued heating solidification takes place in the phenol-formaldehyde layer and resinous matter separates from the oily constituent. An important feature of our process is that the partial ester employed is usually sufficiently water soluble to give good results (adequate mixing) when aqueous formaldehyde is used; this is not true of the fatty oil. The practicability of using aqueous formaldehyde, the shortening of the time of reaction, and the increased rate of hardening of the film, are advantages not found in previously devised processes for making oil modified phenol-aldehyde resins.

We claim:

1. A process for making resinous compositions which comprises subjecting to prolonged heating in inert volatile organic solvent a reaction mixture the reactants of which consist solely of a phenol, an aldehyde and a polyhydric alcohol partially esterified with fatty oil acid until a resinous product containing the partially esterified alcohol as an indistinguishable part thereof, irremovable as such, is formed.

2. A process which comprises boiling under a reflux condenser 4 to 5 hours in 20 pounds of methylated spirit containing 6 pounds of saturated caustic soda solution a reaction mixture the reactants of which consist solely of 20 pounds of mixed xylenols, 20 pounds of 40% formaldehyde solution, and 20 pounds of mono-glyceride obtained by heating tung oil with glycerol, distilling the product thus obtained up to a temperature in the liquid of 120° C. and continuing the heating at 110–120° C. for about 4 hours.

3. The process set forth in claim 1 in which said aldehyde is formaldehyde, the polyhydric alcohol is glycerol, and the fatty oil acid is drying oil acid.

ALAN ASHBY DRUMMOND.
HOWARD HOULSTON MORGAN.